US010275954B2

(12) United States Patent
Mueller

(10) Patent No.: US 10,275,954 B2
(45) Date of Patent: Apr. 30, 2019

(54) VEHICLE AXLE ASSEMBLY

(71) Applicant: AGCO International GmbH, Neuhausen (CH)

(72) Inventor: Thomas Mueller, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 15/759,298

(22) PCT Filed: Sep. 8, 2016

(86) PCT No.: PCT/EP2016/071168
§ 371 (c)(1),
(2) Date: Mar. 12, 2018

(87) PCT Pub. No.: WO2017/042265
PCT Pub. Date: Mar. 16, 2017

(65) Prior Publication Data
US 2018/0253914 A1    Sep. 6, 2018

(30) Foreign Application Priority Data
Sep. 10, 2015  (GB) .................................. 1516037.7

(51) Int. Cl.
*G07C 5/08* (2006.01)
*A01B 76/00* (2006.01)
(Continued)

(52) U.S. Cl.
CPC .......... *G07C 5/0808* (2013.01); *A01B 63/112* (2013.01); *A01B 76/00* (2013.01); *G01G 19/08* (2013.01)

(58) Field of Classification Search
CPC ....... G07C 5/0808; A01B 76/00; G01G 19/08
See application file for complete search history.

(56) References Cited

U.S. PATENT DOCUMENTS

| 4,173,259 A | 11/1979 | Heckenkamp |
| 5,205,514 A * | 4/1993 | Patzig .................... G01G 19/07 177/136 |

(Continued)

FOREIGN PATENT DOCUMENTS

| DE | 4442355 | * | 5/1996 |
| EP | 1627762 A2 | | 2/2006 |

(Continued)

OTHER PUBLICATIONS

European Patent Office, International Search Report for related International Application PCT/EP2016/071168, dated Dec. 9, 2016.

*Primary Examiner* — Michael J Zanelli

(57) ABSTRACT

A vehicle axle assembly includes an axle shaft having a first planar portion extending from the shaft perpendicular to the axis of rotation, and an axle housing partially surrounding and rotatably supporting the axle shaft with a second planar portion extending from the axle housing adjacent and substantially parallel to the first planar portion. Two or more sensor arrangements are provided, each having a first sensor part on the first planar portion and a second sensor part on the second planar portion, with each sensor arrangement being configured to generate a signal indicative of a measured gap between the first and second planar portions. A data processor coupled with the sensor arrangements generates an indication of axle shaft bending from differences in the measured gap between sensor arrangements, which indication may then be used to derive a measurement for vehicle axle loading.

8 Claims, 1 Drawing Sheet

(51) Int. Cl.
    *G01G 19/08*     (2006.01)
    *A01B 63/112*     (2006.01)

(56) References Cited

U.S. PATENT DOCUMENTS

| | | |
|---|---|---|
| 9,078,391 B2 | 7/2015 | Pichlmaier |
| 9,095,089 B2 | 8/2015 | Pichlmaier |
| 2005/0081649 A1 | 4/2005 | Takahashi |
| 2006/0070464 A1* | 4/2006 | Walker ............... G01L 1/2243 |
| | | 73/862.631 |

FOREIGN PATENT DOCUMENTS

| | | |
|---|---|---|
| EP | 2 851 667 A2 | 3/2015 |
| WO | 2013/104981 A1 | 7/2013 |

\* cited by examiner

VEHICLE AXLE ASSEMBLY

BACKGROUND OF THE INVENTION

Field of Invention

The present invention relates to means for facilitating measuring of the deformation of a rigid axle and especially, although not exclusively, the rear axle of an agricultural vehicle such as a tractor. Further the invention relates to determining axle loading for such an axle based on the measured deformation.

Description of Related Art

To improve efficiency and reduce damage to the ground during operation, modern tractors may be equipped with tyre pressure control systems or efficiency control systems as described in applicant's United States patents U.S. Pat. Nos. 9,078,391 and 9,095,089. In operation, these systems require a precise knowledge of the wheel load of each wheel or axle to enable, for example, the adjustment of tyre pressures without exceeding the tyre capability, or the generation of an optimised load distribution profile to provide guidance to the operator on ballasting of the tractor.

It is well known, for suspended axles, to determine the wheel load by measuring the pressure in the hydraulic or pneumatic cylinders of the suspension. However, in the case of a tractor, only the front axle is equipped with such a suspension system from which the wheel load may be determined, so the rear axle requires a different solution. According to one approach, it is known to use axle bearings which are equipped with load sensing means. These means require changes in the axle installation and are costly. Furthermore, optional usage is not generally an economic option due to the impact of the changes on the complete axle design and the resulting costs.

United States patent U.S. Pat. No. 4,173,259 describes a load sensing device which senses deformation of the rear drive housing of a tractor to control the draft load by raising or lowering of an implement. The sensing may be electrical or mechanical and the signal produced by the strain on the rear drive is amplified and used to control a hydraulic control valve to a hydraulic weight distribution system. The document indicates that electric strain gauges or sensors may be mounted on any member deforming in response to loading. However, the performance of strain gauges can vary widely with position and less than optimum performance can easily result.

It is, therefore, an object of the invention to provide an improved axle assembly which mitigates at least some of the above problems.

OVERVIEW OF THE INVENTION

In accordance with a first aspect of the present invention there is provided a vehicle axle assembly comprising:
- an axle shaft in the form of an elongate body extending along an axis of rotation and having a first planar portion extending from the shaft perpendicular to the axis of rotation;
- an axle housing partially surrounding and rotatably supporting the axle shaft, wherein a second planar portion extends from the axle housing adjacent and substantially parallel to the first planar portion;
- two or more sensor arrangements each having a first sensor part on the first planar portion and a second sensor part on the second planar portion, with each sensor arrangement being configured to generate a signal indicative of a measured gap between the first and second planar portions; and
- a data processor coupled with the sensor arrangements and arranged to generate an indication of axle shaft bending from differences in the measured gap between sensor arrangements.

Suitably with at least one sensor arrangement directly above the axis of rotation and one below, comparison of the different gap measurements will indicate axle shaft bending due to vertical loading. Further sensor arrangements, each having as before a first sensor part on the first planar portion and a second sensor part on the second planar portion with the sensor parts of the two or more sensor arrangements regularly spaced on a predetermined radius about the axis of rotation of the axle shaft may also be provided to give an indication of deformation due to pulling forces.

Preferably the sensor arrangements are in form of discs (stator, rotor) aligned on the axis of rotation and which can provide signals from the whole circumference thereof.

The vehicle axle assembly preferably further comprises data storage means coupled with the data processor and holding a look-up table from which the data processor obtains a value for axle loading based on the extent of axle shaft bending. Such data storage may also hold a value representative of an expected gap between the planar portions, with the data processor then being arranged to generate an alert if the measured gap and expected gap differ by more than a predetermined extent (as may be indicative of wear or damage to the axle assembly components). Instead of a look-up table, the data processor may apply a predetermined linear function to derive the loading based on the axle shaft bending.

The vehicle axle assembly may further comprise one or more temperature sensors coupled with the data processor, with the data processor being arranged to adjust the expected gap value by reference to a sensed temperature. As will be understood, variations in ambient temperature together with differing thermal expansion characteristics for the materials of axle shaft and housing may cause gap variations which are not due to component wear, which should not be signalled as alarm conditions, and which are preferably accounted for in the determination of axle shaft bending.

The value representative of an expected gap may be one that is loaded to data storage as a factory setting, or may be loaded to data storage by the data processor from a previously measured gap, optionally with storage of a history of gap measurements or representative values to support predictive maintenance scheduling.

The present invention further comprises a vehicle, and preferably a farm tractor, including such an axle assembly.

BRIEF DESCRIPTION OF THE DRAWINGS

The present invention will now be described, by way of example only, with reference to the accompanying drawings in which.

DETAILED DESCRIPTION OF THE INVENTION

Figure 1:
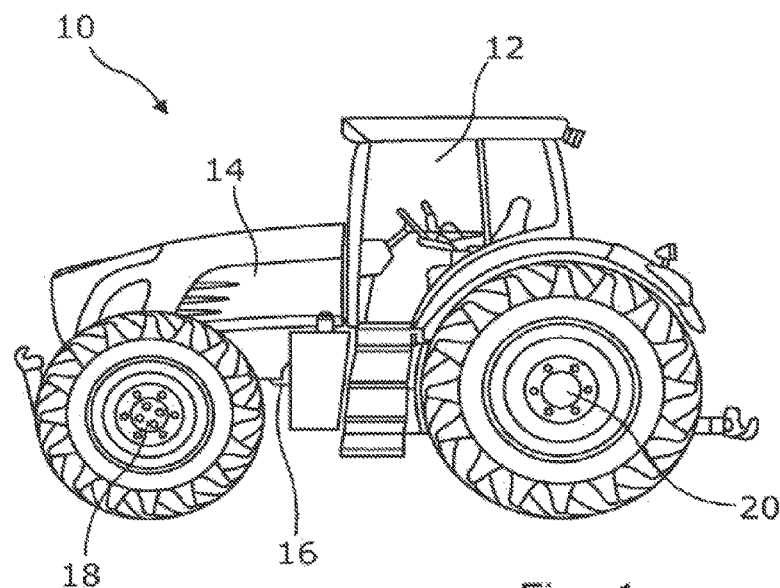
FIG. 1 is a representation of a tractor.

Referring to FIG. 1, a tractor 10 is shown having a cab 12 and an engine compartment 14. A chassis 16 which is partly visible connects front wheel mounting 18 and rear axle assembly 20. The front wheel mounting 18 is equipped with an independent wheel suspension as described in applicants granted patent EP 1 627 762 with upper and lower transverse links mounting steered wheel hubs to the chassis and with vertical movement of each hub being damped by a respective hydraulic cylinder. As mentioned previously, the load of the front axle can be determined by measuring the pressure in the hydraulic cylinders of the suspension.

Figure 2:
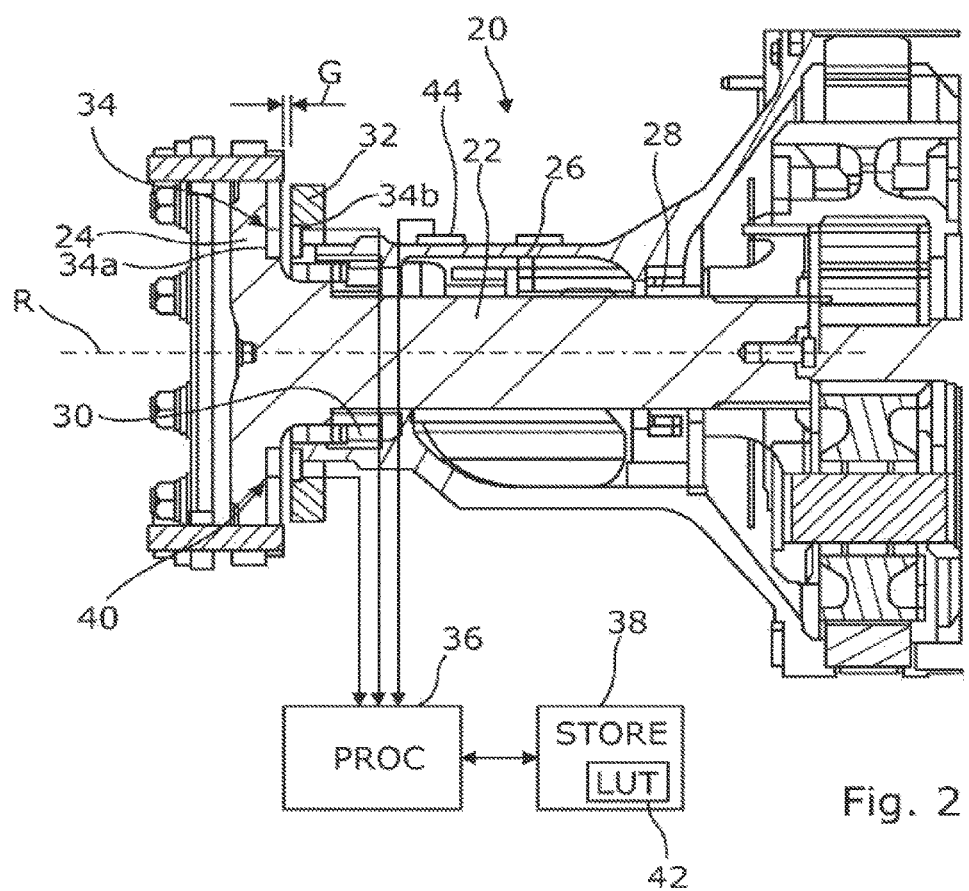
FIG. 2 shows a section through a part of a rear axle assembly with additional components represented schematically.

FIG. 2 shows a sectional view through a part of the rear axle assembly 20 which includes an axle shaft 22 in the form of an elongate body extending along an axis of rotation R. The shaft 22 has an end flange 24 in the form of a first planar portion extending from the shaft perpendicular to the axis of rotation: the flange 24 provides the attachment point for a wheel carried by the axle.

An axle housing 26 partially surrounds the axle shaft 22, expanding to a trumpet housing (to the right of the figure) which in turn is connected to a centre differential (not shown) of the rear axle assembly. The axle housing 26 rotatably supports the axle shaft 22 by means of taper roller bearings 28, 30. From the housing 26, a second flange or planar portion 32 extends outwardly from the housing to lie adjacent and substantially parallel to the first planar portion 24.

A first sensor arrangement 34 has a first sensor part 34a on (or preferably inset into) the first planar portion 24 and a second sensor part 34b on (inset into) the second planar portion 32. The sensor parts 34a, 34b are the same radial distance from the axis of rotation R such that they pass in close proximity once in each revolution of the axle shaft 22. Different types of sensor arrangement may be used, such as a permanent magnet for the first part 34a and induction loop for the second part 34b, with the sensor arrangement being configured to generate a signal indicative of a measured gap G between the first and second planar portions 24, 32 when the sensor parts are aligned.

A data processor 36 is coupled with the sensor arrangement 34 and with data storage 38. The processor 36 and store 38 may be stand-alone units, or may comprise functions of a general engine management system for the tractor 10. In one embodiment, the store 38 holds a value representative of an expected gap between the first 24 and second 32 planar portions, with the data processor 36 being arranged to generate an alert if the measured gap G and expected gap E differ by more than a predetermined extent.

The expected gap E may be a factory set value, in which case an initially generated alert on start-up may be indicative of incorrect fitting of the axle shaft 22 or bearings 28, 30 or subsequently may be indicative of wear of these components. As an alternative, the expected gap E value may be captured as a measured gap G value and subsequently held in store 38.

As indicated generally at 40, further sensor arrangements are suitably provided spaced around the axis of rotation R to enable the capture of multiple measurements $G_1$, $G_2$ etc. for the gap between the first 24 and second 32 planar portions. With multiple measurements and comparison between them or with stored expected value(s), the processor 36 determines from the variations an angle between the normally parallel (in unloaded conditions) first 24 and second 32 planar portions. This angle is a result of axle shaft 22 bending as axle load increases. Data store 38 holds a look-up table 42 from which the data processor 36 obtains a value for axle loading based on the extent of axle shaft bending as represented by the angle between the first 24 and second 32 planar portions. Instead of a look-up table, the data processor 36 may apply a predetermined linear function to derive the loading based on the axle shaft bending.

In the foregoing the applicants have described a vehicle axle assembly including an axle shaft 22 having a first planar portion 24 extending from the shaft perpendicular to the axis of rotation, and an axle housing 26 partially surrounding and rotatably supporting the axle shaft 22 with a second planar portion 32 extending from the axle housing adjacent and substantially parallel to the first planar portion 24. Two or more sensor arrangements 34, 40 are provided, each having a first sensor part 34a on the first planar portion 24 and a second sensor part 34b on the second planar portion 32, with each sensor arrangement being configured to generate a signal indicative of a measured gap G between the first and second planar portions. A data processor 36 coupled with the sensor arrangements 34, 40 generates an indication of axle shaft 22 bending from differences in the measured gap between sensor arrangements, which indication may then be used to derive a measurement for vehicle axle loading.

The vehicle axle assembly 20 may further comprise one or more temperature sensors 44 coupled with the data processor, with the data processor being arranged to adjust the expected gap value by reference to a sensed temperature. As will be understood, variations in ambient temperature together with differing thermal expansion characteristics for the materials of axle shaft 22 and housing 26 may cause pap variations which are not due to component wear, which should not be signalled as alarm conditions, and which are preferably accounted for in the determination of axle shaft bending.

From reading of the present disclosure, other modifications will be apparent to those skilled in the art. Such modifications may involve other features which are already known in the field of vehicle axles and component parts therefore and which may be used instead of or in addition to features described herein.

The invention claimed is:

1. A vehicle axle assembly comprising:
   an axle shaft in the form of an elongate body extending along an axis of rotation and having a first planar portion extending from the shaft perpendicular to the axis of rotation;
   an axle housing partially surrounding and rotatably supporting the axle shaft, wherein a second planar portion extends from the axle housing adjacent and substantially parallel to the first planar portion;
   two or more sensor arrangements each having a first sensor part on the first planar portion and a second sensor part on the second planar portion, with each sensor arrangement being configured to generate a signal indicative of a measured gap between the first and second planar portions; and
   a data processor coupled with the sensor arrangements and arranged to generate an indication of axle shaft bending from differences in the measured gap between sensor arrangements.

2. The vehicle axle assembly as claimed in claim 1, further comprising a data storage device coupled with the data processor and holding a look-up table from which the data processor obtains a value for axle loading based on the extent of axle shaft bending.

3. The vehicle axle assembly as claimed in claim 1, wherein a data storage device holds a value representative of an expected gap between the first and second planar portions, the data processor being arranged to generate an alert if the measured gap and expected gap differ by more than a predetermined extent.

4. The vehicle axle assembly as claimed in claim 3, further comprising one or more temperature sensors coupled with the data processor, with the data processor being arranged to adjust the expected gap value by reference to a sensed temperature.

5. The vehicle axle assembly as claimed in claim 3, wherein the value representative of an expected gap has been loaded to the data storage device as a factory setting.

6. The vehicle axle assembly as claimed in claim 3, wherein the value representative of an expected gap has been loaded to the data storage device by the data processor from a previously measured gap.

7. The vehicle axle assembly as claimed in claim 1, wherein the sensor parts of the two or more sensor arrangements are regularly spaced on a predetermined radius about the axis of rotation of the axle shaft.

8. An agricultural vehicle including the vehicle axle assembly as claimed in claim 1.

\* \* \* \* \*